United States Patent
Abedini et al.

(10) Patent No.: US 11,805,063 B2
(45) Date of Patent: Oct. 31, 2023

(54) ROUND-TRIP TIME SIGNALING

(71) Applicant: QUALCOMM Incorporated, San Diego, CA (US)

(72) Inventors: Navid Abedini, Basking Ridge, NJ (US); Bilal Sadiq, Basking Ridge, NJ (US); Muhammad Nazmul Islam, Littleton, MA (US); Jianghong Luo, Skillman, NJ (US); Junyi Li, Fairless Hills, PA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/443,817

(22) Filed: Jul. 27, 2021

(65) Prior Publication Data

US 2021/0367897 A1 Nov. 25, 2021

Related U.S. Application Data (63) Continuation of application No. 16/441,569, filed on Jun. 14, 2019, now Pat. No. 11,075,846.

(Continued)

(51) Int. Cl.
*H04L 47/283* (2022.01)
*H04W 56/00* (2009.01)
*H04L 43/0864* (2022.01)

(52) U.S. Cl.
CPC ........ *H04L 47/283* (2013.01); *H04L 43/0864* (2013.01); *H04W 56/0045* (2013.01); *H04W 56/0065* (2013.01)

(58) Field of Classification Search
None
See application file for complete search history.

(56) References Cited

U.S. PATENT DOCUMENTS 8,717,972 B2 5/2014 Cheng et al.
9,398,551 B2 7/2016 Fwu et al.
(Continued)

FOREIGN PATENT DOCUMENTS

CN 103298136 A 9/2013
CN 103370971 A 10/2013
(Continued)

OTHER PUBLICATIONS

Huawei: "Network Synchronization of IAB nodes", 3GPP Draft; R2-1806072 Network Synchronization of IAB Nodes, 3rd Generation Partnership Project (3GPP), Mobile Competence Centre ; 650, Route Des Lucioles ; F-06921 Sophia-Antipolis Cedex ; France, vol. RAN WG1, No. Sanya. China; Feb. 16, 2018-Apr. 20, 2019 Apr. 14, 2018, XP051429654, Retrieved from the Internet: URL:http://www.3gpp.org/ftp/Meetings%5F3GPP%5FSYNC/RAN2/Docs/ [retrieved on Apr. 14, 2018], 4 pages.

(Continued)

*Primary Examiner* — Phirin Sam
(74) *Attorney, Agent, or Firm* — QUALCOMM Incorporated (57) ABSTRACT

Various aspects of the present disclosure generally relate to wireless communication. In some aspects, a first wireless node may receive, from a second wireless node, a round-trip time timing advance indicator, wherein the round-trip time timing advance indicator is different from a timing advance indicator used for an uplink transmission timing advance message. In some aspects, the first wireless node may synchronize a timing configuration of the first wireless node to at least one of the second wireless node or a third wireless node based at least in part on the round-trip time timing advance indicator. Numerous other aspects are provided.

20 Claims, 8 Drawing Sheets

Related U.S. Application Data (60) Provisional application No. 62/686,523, filed on Jun. 18, 2018, provisional application No. 62/690,717, filed on Jun. 27, 2018.

(56) References Cited

U.S. PATENT DOCUMENTS

| | | | |
|---|---|---|---|
| 9,698,962 | B2 | 7/2017 | Rajagopalan et al. |
| 9,832,800 | B2 | 11/2017 | Shin et al. |
| 10,425,973 | B2 | 9/2019 | Patel et al. |
| 11,075,846 | B2* | 7/2021 | Abedini ............... H04W 56/009 |
| 2013/0215874 | A1 | 8/2013 | Yang et al. |
| 2013/0336268 | A1* | 12/2013 | Better ............... H04W 56/0045 370/329 |
| 2015/0016402 | A1 | 1/2015 | Wager et al. |
| 2015/0148050 | A1* | 5/2015 | Siomina ............. H04L 27/2646 455/452.1 |
| 2016/0192304 | A1 | 6/2016 | Yi et al. |
| 2016/0192376 | A1* | 6/2016 | Lee ....................... H04W 48/20 370/252 |
| 2016/0302165 | A1 | 10/2016 | Da et al. |
| 2016/0337839 | A1 | 11/2016 | Chae et al. |
| 2016/0337999 | A1* | 11/2016 | Lee ..................... H04W 56/005 |
| 2017/0078990 | A1 | 3/2017 | Chu et al. |
| 2017/0196005 | A1 | 7/2017 | Yang et al. |
| 2017/0331577 | A1 | 11/2017 | Parkvall et al. |
| 2018/0047284 | A1* | 2/2018 | Narasimha ............. G08G 1/094 |
| 2018/0084546 | A1* | 3/2018 | Guo .................. H04W 56/0045 |
| 2018/0124724 | A1* | 5/2018 | Tsai .................. H04W 74/0833 |
| 2018/0132199 | A1 | 5/2018 | Zhang et al. |
| 2018/0198665 | A1* | 7/2018 | Guo .................. H04W 56/0055 |
| 2018/0302915 | A1* | 10/2018 | Einhaus ............ H04W 72/1268 |
| 2019/0104551 | A1* | 4/2019 | Deenoo ............. H04W 72/0453 |
| 2019/0150141 | A1* | 5/2019 | Irukulapati ............... H04L 5/14 370/280 |
| 2019/0222411 | A1* | 7/2019 | Xie ........................... H04L 7/08 |
| 2019/0260487 | A1* | 8/2019 | Kazmi ................. H04B 17/382 |
| 2019/0281588 | A1* | 9/2019 | Zhang ................. H04L 5/0051 |
| 2019/0342845 | A1* | 11/2019 | Laselva ................ H04L 1/1812 |
| 2020/0127808 | A1* | 4/2020 | Takahashi .......... H04N 21/4302 |
| 2021/0067993 | A1* | 3/2021 | Kazmi ................. H04W 24/10 |
| 2021/0091872 | A1 | 3/2021 | Ko et al. |

FOREIGN PATENT DOCUMENTS

| | | |
|---|---|---|
| CN | 104272821 A | 1/2015 |
| CN | 105704807 A | 6/2016 |
| CN | 109565332 A | 4/2019 |
| EP | 2880896 A2 | 6/2015 |
| WO | 2015175291 A1 | 11/2015 |
| WO | 2017091693 A1 | 6/2017 |
| WO | 2018027707 A1 | 2/2018 |

OTHER PUBLICATIONS

International Search Report and Written Opinion—PCT/US2019/037486—ISA/EPO—dated Sep. 10, 2019.

Qualcomm Incorporated: "Enhancements to Support NR Backhaul Links", 3GPP Draft, 3GPP TSG RAN WG1 Meeting #93, R1-1807393, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, 16 Pages, May 12, 2018, XP051463084, Retrieved from the Internet: URL: http://www.3gpp.org/ftp/tsg%5Fran/WG1%5FRL1/TSGR1%5F93/Docs [retrieved on May 12, 2018].

Qualcomm Incorporated: "Network Synchronization for Multi-Hop IAB", 3GPP Draft; R3-183114 Network Synchronization for Multi-Hop IAB, 3rd Generation Partnership Project (3GPP), Mobile Competence Centre ; 650, Route Des Lucioles ; F-06921 Sophia-Antipolis Cedex ; France, vol. RAN WG3, No. Busan, South Korea; May 21, 2018-May 25, 2018 May 11, 2018, XP051527283, Retrieved from the Internet: URL:http://www.3gpp.org/ftp/tsg%5Fran/WG3%5Fiu/TSGR3%5F100/Docs/R3%2D183114%2Ezip [retrieved on May 11, 2018], 10 pages.

Qualcomm Incorporated: "Timing Synchronization across IAB Topology", 3GPP Draft; R3-181947 Timing Synchronization across IAB Topology, 3rd Generation Partnership Project (3GPP), Mobile Competence Centre ; 650, Route Des Lucioles ; F-06921 Sophia-Antipolis Cedex ; France, vol. RAN WG3, No. Sanya, China; Apr. 16, 2018-Apr. 20, 2018 Apr. 15, 2018, XP051430110, Retrieved from the Internet: URL:http://www.3gpp.org/ftp/Meetings%5F3GPP%5FSYNC/RAN3/Docs/ [retrieved on Apr. 15, 2018], 5 pages.

Ericsson: "On Timing Advance Offsets for TDD and FDD HD", TSG-RAN WG1 #53, R1-082007, Kansas City, USA, May 5-9, 2008, 1 Page.

LG Electronics Inc:"DL/UL TX/RX Timing Relationship Considering Relay Node", TSG-RAN WG1 Meeting #58, R1-093242, Shenzhen, China, Aug. 24-28, 2009, 3 Pages.

Nokia., et al., "Discussion on Network Assistance for Network Synchronization", 3GPP TSG-RAN WG4 Meeting #80bis, R4-168265, Ljubljana Slovenia, Oct. 10-14, 2016, 5 Pages.

Qualcomm Incorporated: "Network Synchronization for Multi-Hop IAB", 3GPP TSG RAN WG2 Meeting #102, R2-1808008, Busan, South Korea, May 21-25, 2018, 9 Pages, May 11, 2018.

* cited by examiner

FIG. 6

ROUND-TRIP TIME SIGNALING

CROSS-REFERENCE TO RELATED APPLICATIONS UNDER 35 U.S.C. § 119

This application is a continuation of U.S. patent application Ser. No. 16/441,569, filed on Jun. 14, 2019 (now U.S. Pat. No. 11,075,846), entitled "ROUND-TRIP TIME SIGNALING," which claims priority to U.S. Provisional Patent Application No. 62/686,523, filed on Jun. 18, 2018, entitled "TECHNIQUES AND APPARATUSES FOR ROUND-TRIP TIME SIGNALING" and to U.S. Provisional Patent Application No. 62/690,717, filed on Jun. 27, 2018, entitled "TECHNIQUES AND APPARATUSES FOR ROUND-TRIP TIME SIGNALING," which are hereby expressly incorporated by reference herein.

FIELD OF THE DISCLOSURE

Aspects of the present disclosure generally relate to wireless communication, and to techniques and apparatuses for round-trip time signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first wireless node, may include receiving, from a second wireless node, a round-trip time timing advance indicator, wherein the round-trip time timing advance indicator is different from a timing advance indicator used for an uplink transmission timing advance message, and wherein the round-trip time timing advance indicator identifies a timing offset from a timing identified by the timing advance indicator. The method may include synchronizing a timing configuration of the first wireless node to at least one of the second wireless node or a third wireless node based at least in part on the round-trip time timing advance indicator.

In some aspects, a first wireless node for wireless communication may include memory and one or more processors operatively coupled to the memory. The memory and the one or more processors may be configured to receive, from a second wireless node, a round-trip time timing advance indicator, wherein the round-trip time timing advance indicator is different from a timing advance indicator used for an uplink transmission timing advance message, and wherein the round-trip time timing advance indicator identifies a timing offset from a timing identified by the timing advance indicator. The memory and the one or more processors may be configured to synchronize a timing configuration of the first wireless node to at least one of the second wireless node or a third wireless node based at least in part on the round-trip time timing advance indicator.

In some aspects, a non-transitory computer-readable medium may store one or more instructions for wireless communication. The one or more instructions, when executed by one or more processors of a first wireless node, may cause the one or more processors to receive, from a second wireless node, a round-trip time timing advance indicator, wherein the round-trip time timing advance indicator is different from a timing advance indicator used for an uplink transmission timing advance message, and wherein the round-trip time timing advance indicator identifies a timing offset from a timing identified by the timing advance indicator. The one or more instructions, when executed by the one or more processors of the first wireless node, may cause the one or more processors to synchronize a timing configuration of the first wireless node to at least one of the second wireless node or a third wireless node based at least in part on the round-trip time timing advance indicator.

In some aspects, an apparatus for wireless communication may include means for receiving, from a wireless node, a round-trip time timing advance indicator, wherein the round-trip time timing advance indicator is different from a timing advance indicator used for an uplink transmission timing advance message, and wherein the round-trip time timing advance indicator identifies a timing offset from a timing identified by the timing advance indicator. The apparatus may include means for synchronizing a timing configuration of the apparatus to at least one of the wireless node or another wireless node based at least in part on the round-trip time timing advance indicator.

Aspects generally include a method, device, apparatus, computer program product, non-transitory computer-readable medium, user equipment, base station, wireless node, network node, child node, parent node, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
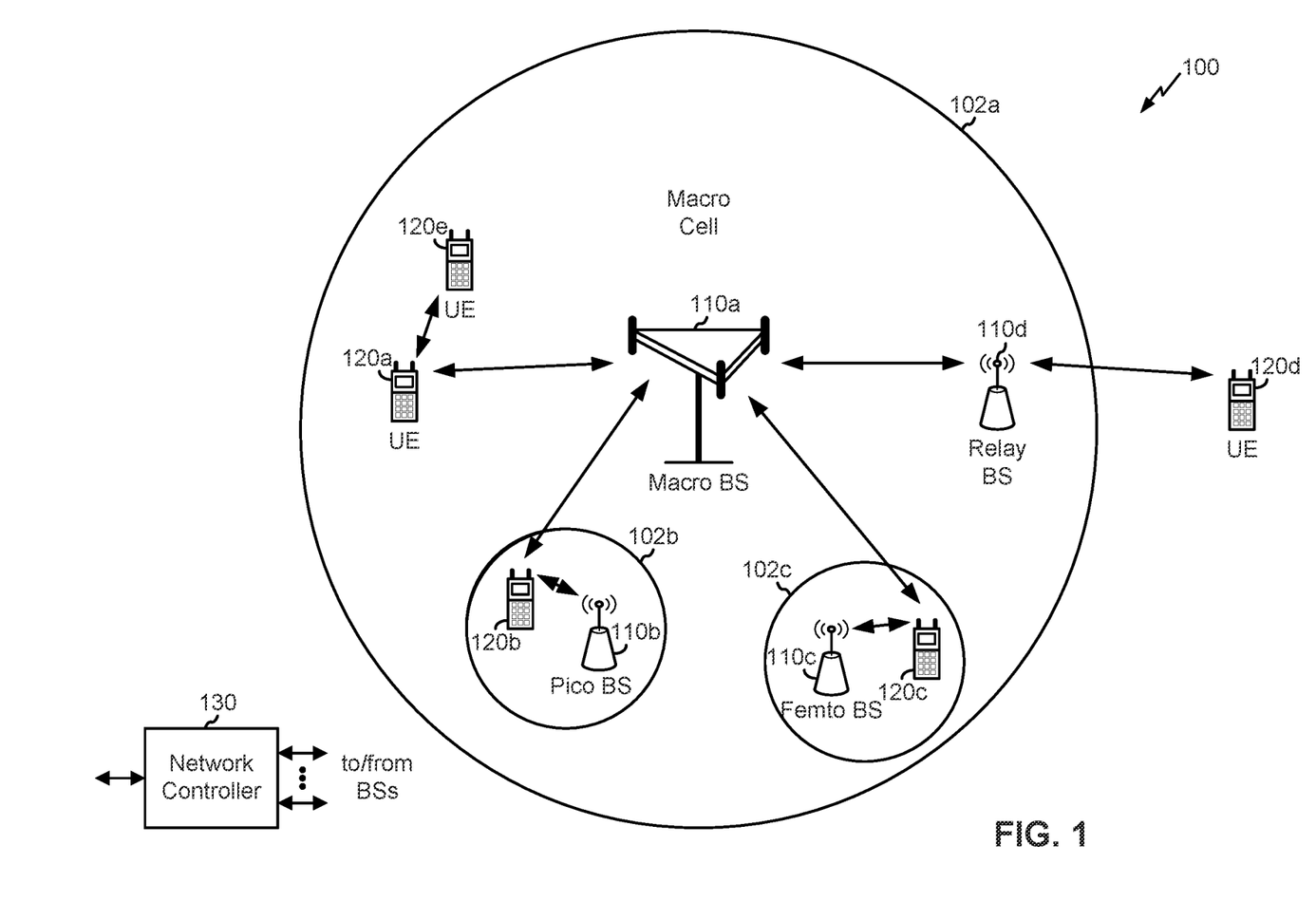
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
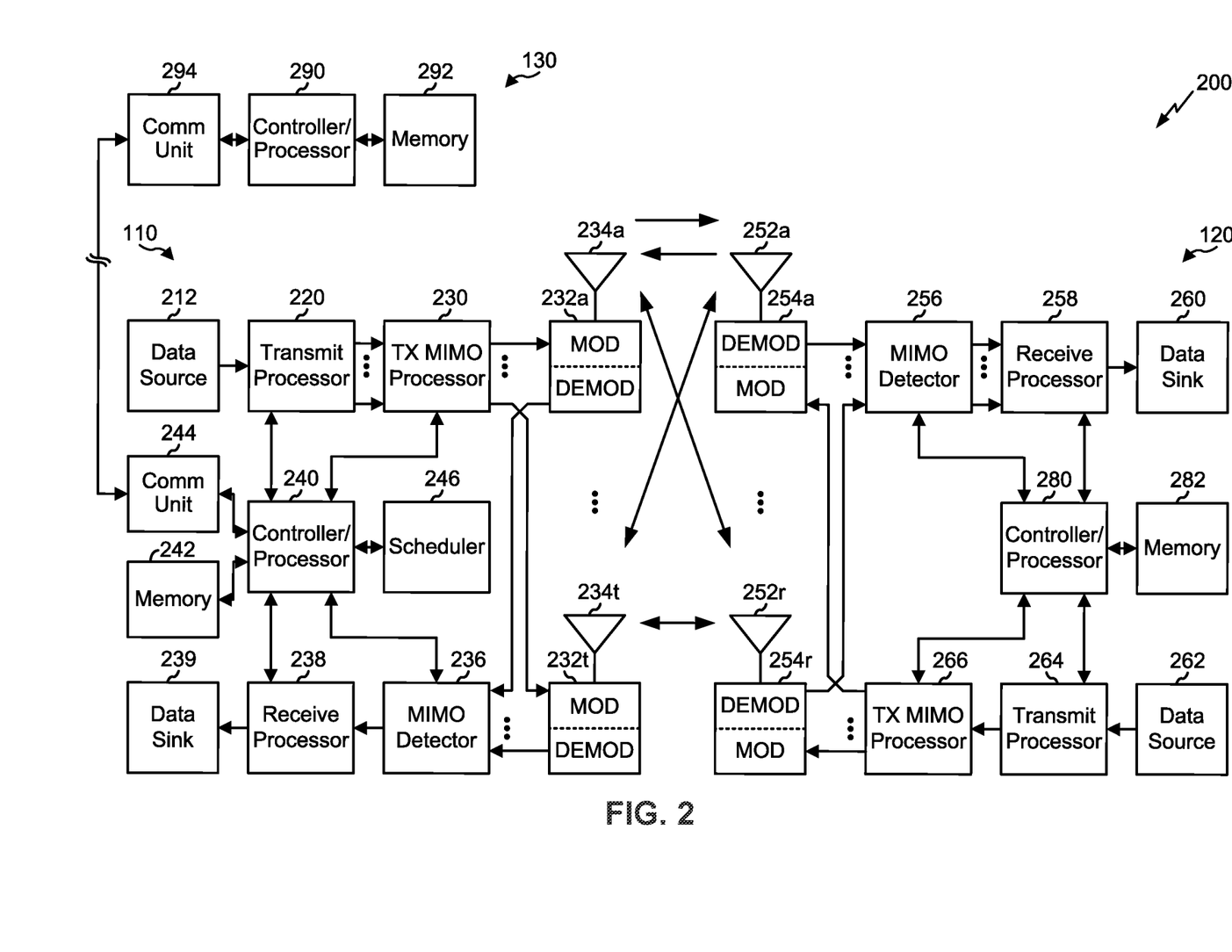
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with round-trip time signaling, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, a first wireless node (e.g., base station 110, UE 120, and/or the like) may include means for receiving, from a second wireless node, a round-trip time timing advance indicator, wherein the round-trip time timing advance indicator is different from a timing advance indicator used for an uplink transmission timing advance message, and wherein the round-trip time timing advance indicator identifies a timing offset from a timing identified by the timing advance indicator; means for synchronizing a timing configuration of the first wireless node to at least one of the second wireless node or a third wireless node based at least in part on the round-trip time timing advance indicator; and/or the like. In some aspects, such means may include one or more components of base station 110, UE 120, and/or the like described in connection with FIG. 2.

As indicated above, FIG. 2 is provided merely as an example. Other examples may differ from what is described with regard to FIG. 2.

Figure 3A:
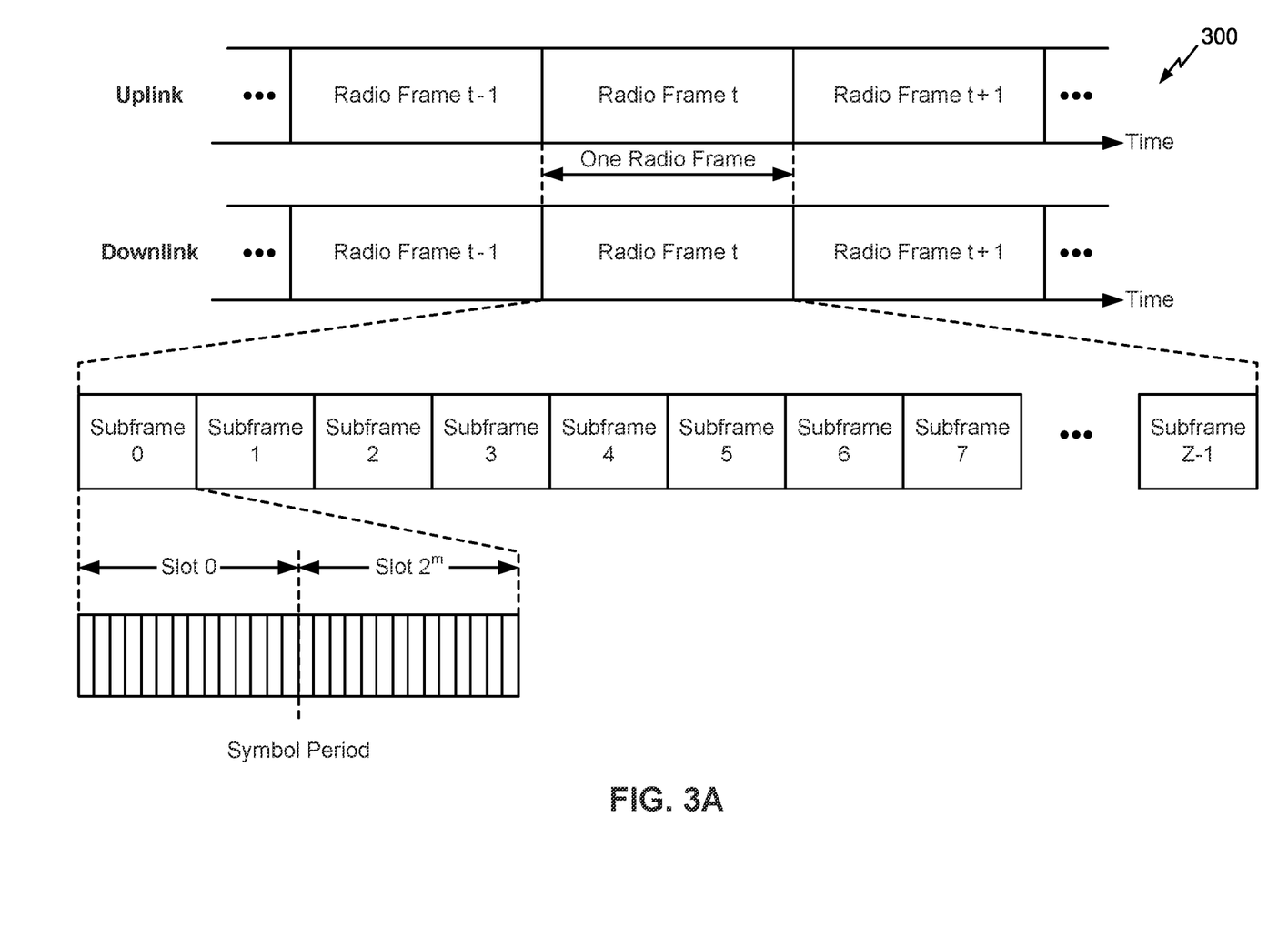
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
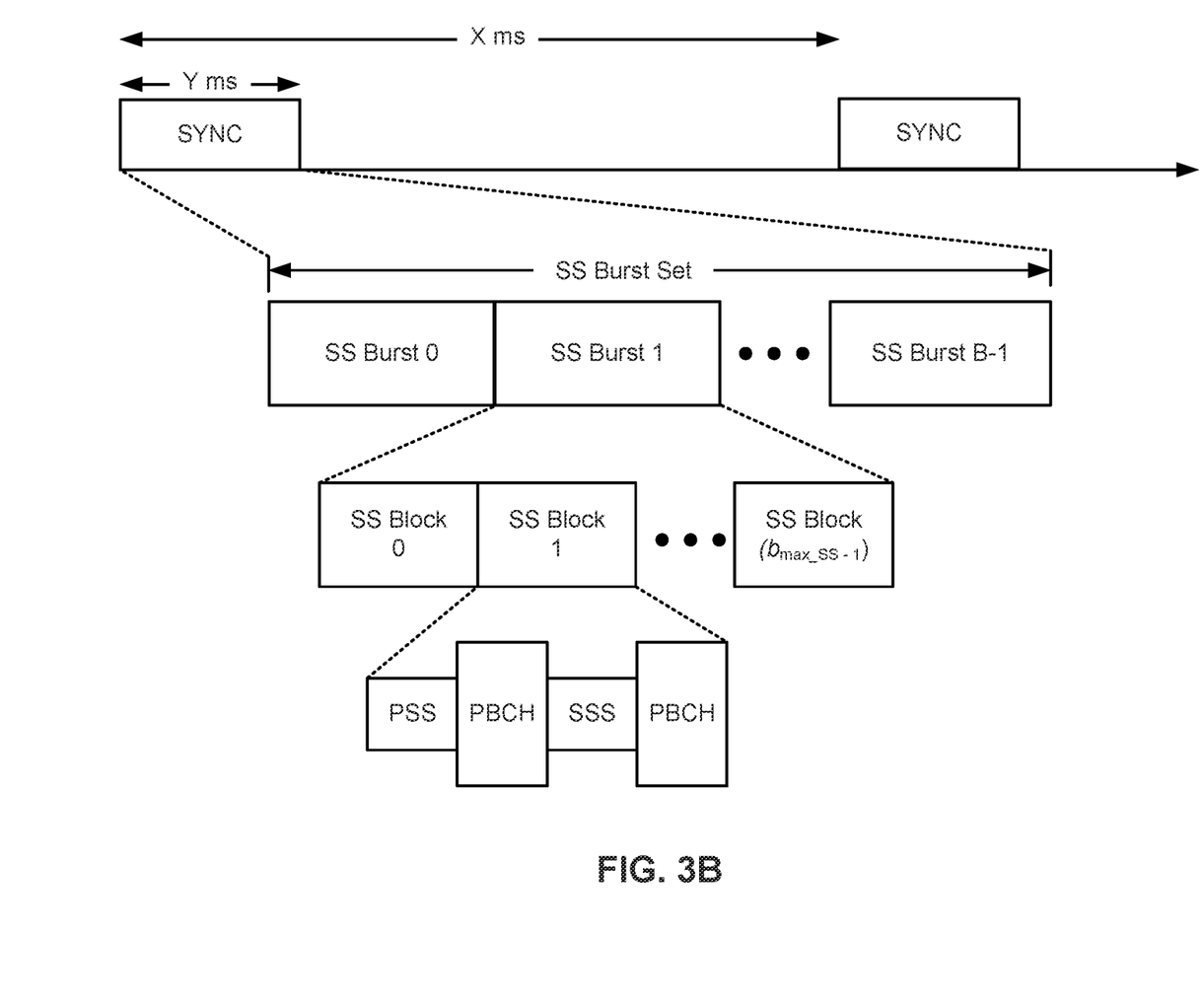
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is am a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some communications systems, such as NR, a multi-hop network may be deployed to enable communication between wireless nodes of the network. The wireless nodes may be associated with a timing configuration that enables alignment of communications between wireless nodes associated with different links. For example, a timing reference may be used to identify a set of communication opportunities, such as a set of slots allocated for a set of channels. A master node may determine a round-trip time estimate associated with a propagation delay of a link, and may provide, to a plurality of child nodes, an uplink transmission timing advance message, which may be termed an uplink transmission timing advance command, to indicate the round-trip time estimate. The plurality of child nodes may use the uplink transmission timing advance message to align uplink reception timing. The master node may tolerate a threshold time misalignment between the plurality of child nodes. Each child node may determine an uplink transmission timing based at least in part on the round-trip time estimate indicated in the uplink transmission timing advance message. A quantity of hops, which may be supported by a multi-hop network, may correspond to a level of timing synchronization (e.g., an accuracy with which communication opportunities are synchronized between a set of wireless nodes).

However, using the round-trip time estimate indicated in the uplink transmission timing advance message may result in an inaccurate configuration of uplink transmission timing. For example, based at least in part on the threshold time misalignment tolerance, the round-trip time estimate for the plurality of child nodes may be different from a round-trip time estimate for a particular link with a particular child node resulting in a timing misalignment. Moreover, based at least in part on a periodicity of a determination of the round-trip time estimate, a round-trip time for a particular link may change before the round-trip time estimate is updated, resulting in a timing misalignment. The timing misalignment may reduce synchronization of child nodes, which may result in inaccurate positioning determinations, less than a threshold quantity of hops being supported in a multi-hop network, increased interference, and/or the like.

Some implementations described herein may perform round-trip time signaling. For example, a wireless node may transmit and/or receive a round-trip time timing advance indicator, which may be termed a round-trip time accurate timing advance command (RTT-accurate TA command), that is different from a timing advance indicator used for an uplink transmission timing advance message. In this case, the round-trip time timing advance indicator may be, relative to a timing advance indicator used for an uplink transmission timing advance message, associated with a larger quantity of bits, a finer granularity, a tighter requirement for transmission timing error, a tighter requirement for a timing advance adjustment error, and/or the like to improve an accuracy of a timing configuration determined based at least in part on the round-trip time timing advance indicator. In this way, an accuracy of timing configuration is improved, synchronization of a multi-hop network is improved, positioning accuracy is improved, a quantity of hops supported by a multi-hop network is increased, and/or the like relative to using the timing advance indicator used for the uplink transmission timing advance message.

Figure 4A:
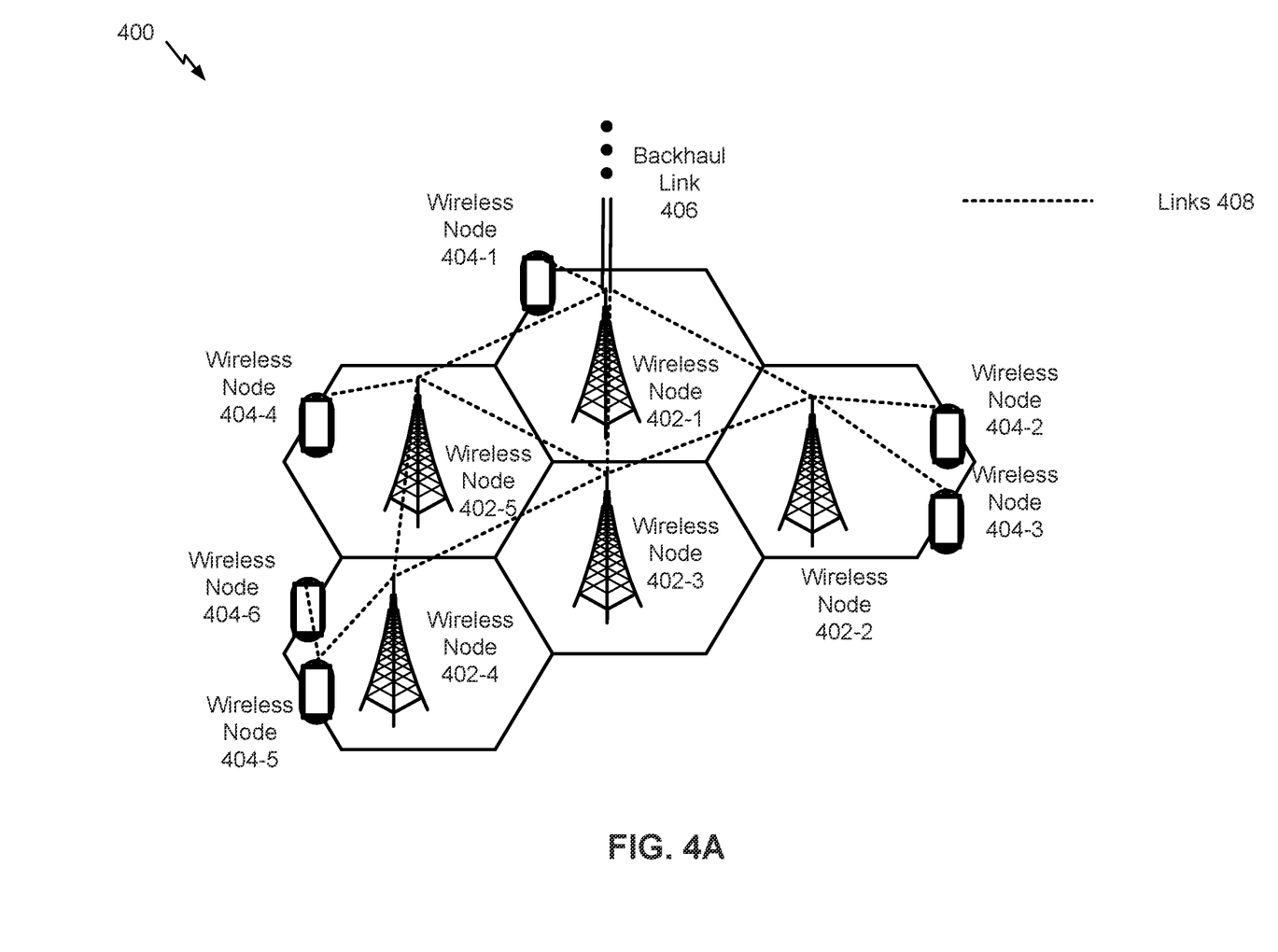
FIGS. 4A and 4B are diagrams illustrating an example of a network topology for a network, in accordance with various aspects of the present disclosure.
Figure 4B:
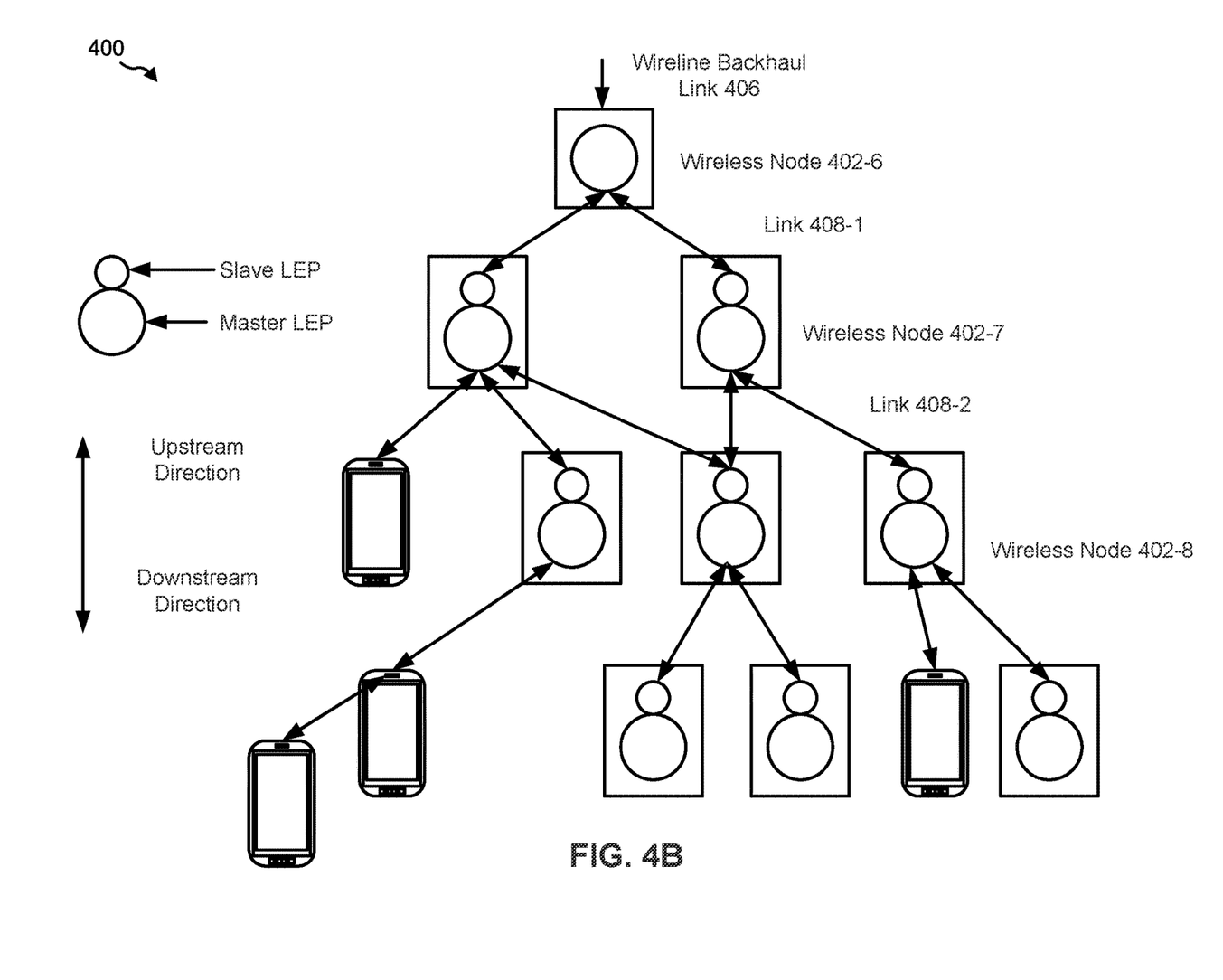

FIGS. 4A and 4B are diagrams illustrating an example 400 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., a BS 110, a UE 120, and/or the like) may communicate backhaul traffic via first mmWave resources with a second wireless node, and may communicate access traffic via second mmWave resources with a third wireless node. In some aspects, the second wireless node and the third wireless node may be the same wireless node. For example, the first wireless node may communicate traffic via first mmWave resources and second mmWave resources. Although some aspects, described herein, are described in terms of an IAB deployment, some aspects described herein may be used in connection with other types of multi-hop networks.

As shown in FIG. 4A, example 400 may include multiple wireless nodes 402 (e.g., BSs) and multiple wireless nodes 404 (e.g., UEs). At least one wireless node (e.g., wireless node 402-1) may communicate with a core network via a backhaul link 406, such as a fiber connection, a wireless backhaul connection, and/or the like. Wireless nodes 402 and 404 may communicate with each other using a set of links 408, such as a set of mmWave links; a 3G, 4G, 5G, etc. air interface; and/or the like. In some aspects, a wireless node 402 may correspond to BS 110 or UE 120 shown in FIG. 1. Similarly, a wireless node 404 may correspond to BS 110 or a UE 120 shown in FIG. 1.

As further shown in FIG. 4A, one or more wireless nodes 402 or 404 may communicate indirectly via one or more other wireless nodes 402 or 404. For example, data may be transferred from a core network to wireless node 404-6 via backhaul link 406, a link 408 between wireless node 402-1 and wireless node 402-5, a link 408 between wireless node 402-5 and wireless node 402-4, a link 408 between wireless node 402-4 and wireless node 404-5, and a link 408 between wireless node 404-5 and wireless node 404-6. In some aspects, multiple different paths may be used to communicate data between wireless nodes 402 or 404. For example, wireless node 402-5 may communicate with wireless node 402-4 via a single link 408 between wireless node 402-5 and wireless node 402-4 (e.g., a direct link) and/or via a first link 408 between wireless node 402-5 and wireless node 402-3 and a second link between wireless node 402-3 and wireless node 402-4 (e.g., an indirect link). In some aspects, a quantity of hops supported by a network may correspond to a maximum allowable time misalignment. For example, for a first maximum allowable time misalignment (between two wireless nodes 402 or 404), a first quantity of hops may be permissible in the network without causing excessive interference, and for a second maximum allowable time misalignment, a second quantity of hops may be permissible in the network without causing excessive interference.

As shown in FIG. 4B, wireless nodes 402 and wireless nodes 404 can be arranged in a hierarchical topology to enable management of network resources. Each link 408 may be associated with a master link end point (master LEP) and a slave link end point (slave LEP), which may define a hierarchy between wireless nodes 402 or 404. For example, wireless node 402-6 may communicate with wireless node 402-7 via link 408-1. In this case, wireless node 402-6 is associated with a master link end point and wireless node 402-7 is associated with a slave link end point for link 408-1, which may define wireless node 402-6 as hierarchically superior to wireless node 402-7, and wireless node 402-7 as hierarchically inferior to wireless node 402-6 with regard to link 408-1. In this case, wireless node 402-6 may be termed a master node or a parent node and wireless node 402-7 may be termed a slave node or a child node. Moreover, wireless node 402-6 may be defined as upstream relative to wireless node 402-7 (and wireless node 402-7 may be defined as downstream relative to wireless node 402-6).

Similarly, wireless node 402-7 includes a master link end point for link 408-2 and wireless node 402-8 includes a slave link end point for backhaul link 408-2. In this case, wireless node 402-7 is hierarchically superior and upstream to wireless node 402-8, and wireless node 402-8 is hierarchically inferior and downstream to wireless node 402-7 with regard to link 408-2. In this case, wireless node 402-7 may be termed the master node or the parent node and wireless node 402-8 may be termed the slave node or the child node.

As indicated above, FIGS. 4A and 4B are provided as examples. Other examples may differ from what is described with respect to FIGS. 4A and 4B.

Figure 5:
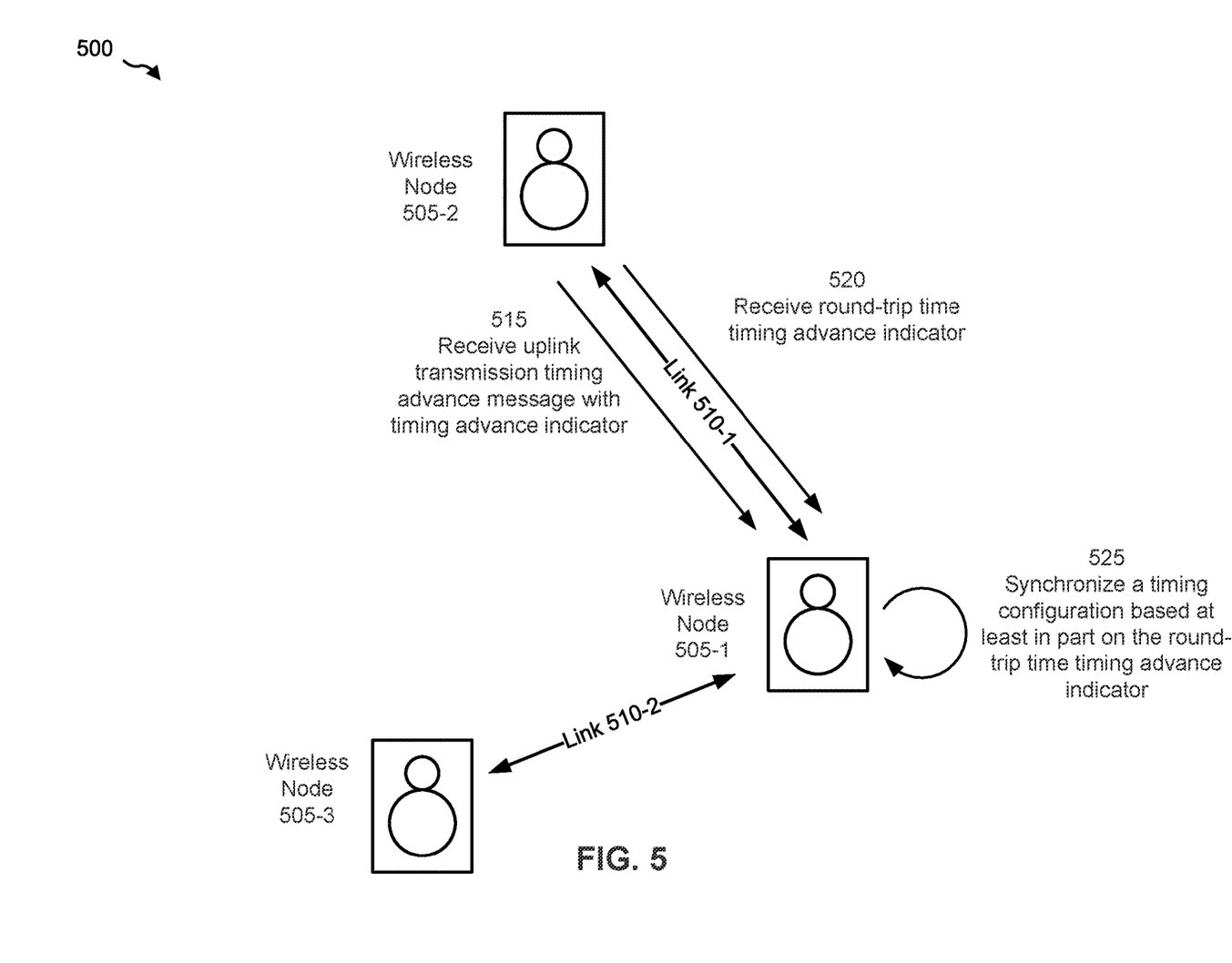
FIG. 5 is a diagram illustrating an example of round-trip time signaling, in accordance with various aspects of the present disclosure.

FIG. 5 is a diagram illustrating an example 500 of round-trip time signaling, in accordance with various aspects of the present disclosure. As shown in FIG. 5, example 500 includes a first wireless node 505-1, a second wireless node 505-2, and a third wireless node 505-3. In some aspects, first wireless node 505-1 and second wireless node 505-2 may communicate via a first link 510-1. In some aspects, first wireless node 505-1 and third wireless node 505-3 may communicate via a second link 510-2. In some aspects, wireless nodes 505 may be BSs 110, UEs 120, or a combination of BSs 110 and UEs 120. For example, first wireless node 505-1 may be a macro BS 110, second wireless node 505-2 may be a relay BS 110, and third wireless node 505-3 may be a UE 120.

As further shown in FIG. 5, and by reference number 515, first wireless node 505-1 may receive, from second wireless node 505-2, an uplink transmission timing advance message with a timing advance indicator. For example, second wireless node 505-2 may provide the uplink transmission timing advance message to first wireless node 505-1 and one or more other child nodes. In this way, second wireless node 505-2 enables alignment of uplink reception timing for first wireless node 505-1 and the one or more other child nodes. In some aspects of the invention, the second node can be a master node and the first node can be a slave node as described herein. However, such hierarchical topology is not necessary.

As further shown in FIG. 5, and by reference number 520, first wireless node 505-1 may receive, from second wireless node 505-2, a round-trip time timing advance indicator that is different from the timing advance indicator used for the uplink transmission timing advance message. For example, second wireless node 505-2 may provide the round-trip time timing advance indicator to identify a round-trip time estimate for first link 510-1. In this way, wireless nodes 505 improve an accuracy of round-trip time timing determination thereby enabling improved synchronization for a multi-hop network, improved positioning for wireless nodes 505, an increased quantity of hops for a multi-hop network, and/or the like. In some aspects, the round-trip time timing advance indicator may indicate an estimate of a round-trip time and may enable time synchronization on an order of less than 1 millisecond, approximately several nanoseconds, and/or the like.

In some aspects, the round-trip time timing advance indicator may indicate a different parameter than the uplink transmission timing advance message. For example, the round-trip time timing advance indicator may indicate a round-trip time estimate and the uplink transmission timing advance indicator may indicate a timing advance command. In some aspects, the round-trip time timing advance indicator may indicate information associated with a single cell (e.g., that includes first wireless node 505-1, second wireless node 505-2, and/or third wireless node 505-3).

In some aspects, the round-trip time timing advance indicator may be a relative adjustment for the uplink transmission timing advance message. For example, first wireless node 505-1 may receive a round-trip time timing advance indicator that indicates a relative adjustment to the timing advance indicator used for the uplink transmission timing advance message. In some aspects, the round-trip time timing advance indicator may be an offset for the uplink transmission timing advance message that accounts for an offset between downlink transmission and uplink reception by second wireless node 505-2, transmission to reception switching time by second wireless node 505-2, a hardware characteristic of second wireless node 505-2 (e.g., a processing capability), and/or the like.

Additionally, or alternatively, first wireless node 505-1 may receive a round-trip time timing advance indicator that indicates a relative adjustment to a previously provided round-trip time timing advance indicator. In this case, a first received round-trip time timing advance indicator may be an absolute timing advance indicator or a relative adjustment to the timing advance indicator used for the uplink transmission timing advance message.

In some aspects, a parameter of the round-trip time timing advance indicator may be different from another parameter of the timing advance indicator used for the uplink transmission timing advance message. For example, first wireless node 505-1 may determine, relative to the timing advance indicator used for the uplink transmission timing advance message, that the round-trip time timing advance indicator includes a different (e.g., greater) quantity of bits (e.g., 12 bits or a greater quantity of bits), a finer level of granularity (e.g., a smaller granularity than a 0.65 nanosecond granularity for a subcarrier spacing of 120 kilohertz (kHz) used for the uplink transmission timing advance message), a reduced transmission timing error, a reduced timing advance adjustment error, and/or the like.

In some aspects, first wireless node 505-1 may receive a round-trip time timing advance indicator determined based at least in part on a reference signal. For example, second wireless node 505-2 may use a wideband signal, a sounding reference signal, a downlink reference signal (DRS), a synchronization signal block (SSB), a tracking reference signal (TRS), a channel state information reference signal (CSI-RS), a positioning reference signal, and/or the like to determine the round-trip time timing advance indicator. In some aspects, second wireless node 505-2 may determine the round-trip time timing advance indicator using a larger subcarrier spacing than for the uplink transmission timing advance message, such as using a 240 kHz subcarrier spacing.

In some aspects, first wireless node 505-1 may receive the round-trip time timing advance indicator based at least in part on requesting the round-trip time timing advance indicator. For example, based at least in part on detecting a change to a downlink reception timing, first wireless node 505-1 may transmit a request for the round-trip time timing advance indicator to maintain synchronization of a timing configuration. In some aspects, first wireless node 505-1 may transmit the request via a random access channel (RACH) message, a contention free RACH (CFRA) message, a physical uplink control channel (PUCCH) message, a media access control (MAC) control element (CE) of a physical uplink shared channel (PUSCH), and/or the like.

As further shown in FIG. 5, and by reference number 525, first wireless node 505-1 may synchronize a timing configuration to second wireless node 505-2 and/or third wireless node 505-3 to enable communication on first link 510-1 and/or second link 510-2. In some aspects, first wireless node 505-1 may determine a round-trip time estimate based at least in part on the round-trip time timing advance indicator. In some aspects, based at least in part on information relating to a downlink reception timing and/or receipt of another timing advance message, first wireless node 505-1 may alter the round-trip time estimate.

In some aspects, first wireless node 505-1 may determine a timing advance group of second wireless node 505-2 and/or third wireless node 505-3 based at least in part on the round-trip time timing advance indicator. For example, first wireless node 505-1 may use the round-trip time timing advance indicator to determine a round-trip time estimate common to each wireless node 505 of the timing advance group, and may synchronize a timing configuration for communication with wireless nodes 505 of the timing advance group. In this case, first wireless node 505-1 may determine that the round-trip time timing advance indicator includes a timing advance group indicator, and first wireless node 505-1 may update stored information identifying the timing advance group indicator for second wireless node 505-2 and/or third wireless node 505-3.

In some aspects, the timing advance group may be defined based at least in part on a common round-trip time timing estimate. For example, first wireless node 505-1 may receive radio resource control (RRC) signaling configuring the timing advance group associated with a plurality of wireless nodes 505, such that the plurality of wireless nodes 505 use a common timing reference cell and/or a common timing advance estimate. In this case, each of the plurality of wireless nodes 505 may be associated with a common cell group (e.g., a common master cell group, a common secondary cell group, and/or the like). In some aspects, a single round-trip time timing advance indicator or a plurality of timing advance indicators may be associated with a single timing advance group. In some aspects, the timing advance group may be a subgroup of an uplink timing advance group defined by a common downlink reference timing, uplink reference timing, and/or the like.

In some aspects, first wireless node 505-1 may determine the timing configuration based at least in part on a mobility state. For example, first wireless node 505-1 may receive and determine the timing configuration based at least in part on whether first wireless node 505-1 and/or second wireless node 505-2 is fixed or mobile. In this case, first wireless node 505-1 may receive the round-trip time timing advance indicator with a first periodicity based at least in part on being fixed and a second periodicity based at least in part on being mobile. Similarly, first wireless node 505-1 may determine a first timing configuration based at least in part on being fixed and a second timing configuration based at least in part on being mobile.

Additionally, or alternatively, first wireless node 505-1 may receive and determine the timing configuration based at least in part on a topological state (e.g., whether first wireless node 505-1 is directly connected to second wireless node 505-2, based at least in part on a quantity of hops separating first wireless node 505-1 and second wireless node 505-2, and/or the like). Additionally, or alternatively, first wireless node 505-1 may receive and determine the timing configuration based at least in part on a capability (e.g., a quantity of reference timings that first wireless node 505-1 may store, a maximum timing misalignment for a network, a latency for first wireless node 505-1 to adjust a timing configuration, and/or the like).

In some aspects, first wireless node 505-1 may provide a report identifying a downlink reception timing (e.g., to second wireless node 505-2 and/or third wireless node 505-3). For example, based at least in part on determining a change to a downlink reception timing, first wireless node 505-1 may provide the report to identify a round-trip time estimate. In this way, first wireless node 505-1 improves an accuracy of time synchronization relative to implicitly signaling a round-trip time estimate by updating an uplink transmission timing. In some aspects, first wireless node 505-1 may detect the change to the downlink reception timing based at least in part on monitoring a wideband downlink signal and/or a wideband downlink channel. In some aspects, first wireless node 505-1 may detect the change to the downlink reception timing based at least in part on a change to the round-trip time estimate, based at least in part on receiving a round-trip time estimate, and/or the like.

In some aspects, first wireless node 505-1 may provide the report of the round-trip time estimate using a MAC CE, an aperiodic report, a periodic report, and/or the like. In some aspects, first wireless node 505-1 may provide the report of the round-trip time estimate based at least in part on receiving a request from, for example, second wireless node 505-2. For example, second wireless node 505-2 may explicitly signal to first wireless node 505-1 that first wireless node 505-1 is to provide a report of the round-trip time estimate rather than implicitly signaling by changing an uplink transmission timing.

As indicated above, FIG. 5 is provided as an example. Other examples may differ from what is described with respect to FIG. 5.

Figure 6:
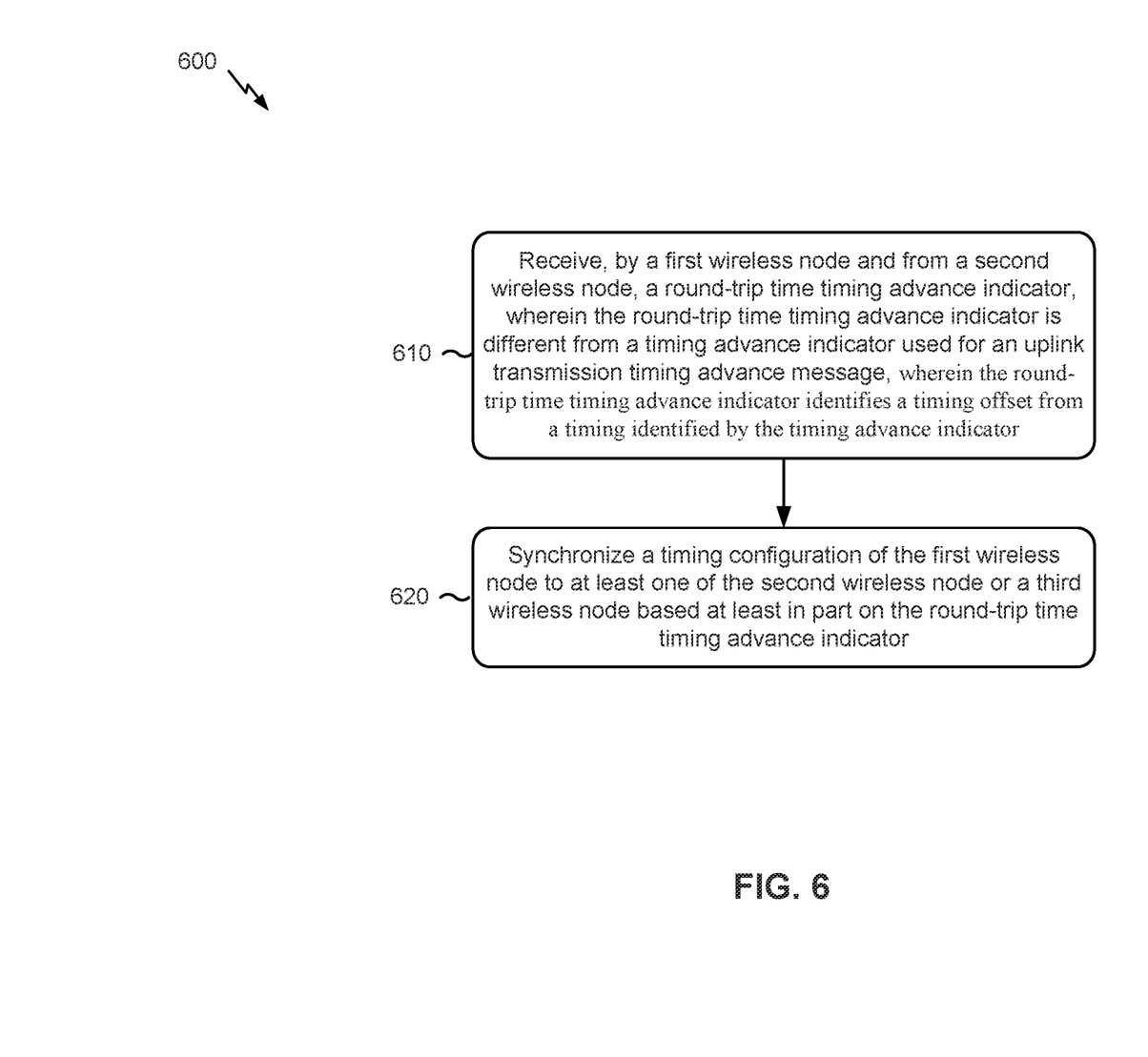
FIG. 6 is a diagram illustrating an example process performed, for example, by a wireless node, in accordance with various aspects of the present disclosure.

FIG. 6 is a diagram illustrating an example process 600 performed, for example, by a wireless node, in accordance with various aspects of the present disclosure. Example process 600 is an example where a first wireless node (e.g., BS 110, UE 120, and/or the like) performs round-trip time signaling.

As shown in FIG. 6, in some aspects, process 600 may include receiving, by a first wireless node and from a second wireless node, a round-trip time timing advance indicator, wherein the round-trip time timing advance indicator is different from a timing advance indicator used for an uplink transmission timing advance message, and wherein the round-trip time timing advance indicator identifies a timing offset from a timing identified by the timing advance indicator (block 610). For example, the first wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, from the second wireless node, the round-trip time timing advance indicator, as described above. In some aspects, the round-trip time timing advance indicator is different from the timing advance indicator used for the uplink transmission timing advance message. In some aspects, the round-trip time timing advance indicator identifies a timing offset from a timing identified by the timing advance indicator.

As shown in FIG. 6, in some aspects, process 600 may include synchronizing a timing configuration of the first wireless node to at least one of the second wireless node or a third wireless node based at least in part on the round-trip time timing advance indicator (block 620). For example, the first wireless node (e.g., using controller/processor 240, controller/processor 280, and/or the like) may synchronize the timing configuration of the first wireless node to at least one of the second wireless node or the third wireless node based at least in part on the round-trip time timing advance indicator, as described above.

Process 600 may include additional aspects, such as any single aspect or any combination of aspects described below and/or in connection with one or more other processes described elsewhere herein.

In a first aspect, the round-trip time timing advance indicator identifies a relative adjustment to the timing advance indicator used for the uplink transmission timing advance message. In a second aspect, alone or in combination with the first aspect, the round-trip time timing advance indicator is independent from the timing advance indicator. In a third aspect, alone or in combination with any one or more of the first and second aspects, relative to the timing advance indicator used for the uplink transmission timing advance message, the round-trip time timing advance indicator is associated with at least one of a different quantity of bits, a reduced separation time between round-trip time timing advance indicators, a reduced threshold transmission timing error, a reduced threshold timing advance error, and/or the like. In a fourth aspect, alone or in combination with any one or more of the first through third aspects, a separation time between round-trip time timing advance indicators is pre-configured, indicated by the second wireless node. or is determined based at least in part on a bandwidth of a reference signal.

In a fifth aspect, alone or in combination with any one or more of the first through fourth aspects, the round-trip time timing advance indicator is received in connection with an uplink reference signal or a downlink reference signal transmitted by the first wireless node. In a sixth aspect, alone or in combination with any one or more of the first through fifth aspects, the first wireless node is configured to determine a round-trip time estimation based at least in part on the round-trip time timing advance indicator. In a seventh aspect, alone or in combination with any one or more of the first through sixth aspects, a timing used for a signal transmitted by the first wireless node is determined based at least in part on one of the round-trip time timing advance indicator or the timing advance indicator used for the uplink transmission timing advance message. In an eighth aspect, alone or in combination with any one or more of the first through seventh aspects, the first wireless node is configured to receive the round-trip time timing advance indicator in connection with a request for the round-trip time timing advance indicator and using at least one of a random access channel message, a contention free random access channel message, a physical uplink control channel, a media access control control element of a physical uplink shared channel, and/or the like. In a ninth aspect, alone or in combination with any one or more of the first through eighth aspects, the timing configuration is determined based at least in part on at least one of a mobility state of the first wireless node, a topological state of the first wireless node, a capability of the first wireless node, and/or the like.

In a tenth aspect, alone or in combination with any one or more of the first through ninth aspects, the first wireless node determines a round-trip time estimation based at least in part on a downlink reference signal. In an eleventh aspect, alone or in combination with any one or more of the first through tenth aspects, a timing to receive the downlink reference signal is different from a timing reference used to receive other downlink signals from the second wireless node. In a twelfth aspect, alone or in combination with the eleventh aspect, the downlink reference signal is a wideband downlink reference signal or is associated with a threshold periodicity.

In a thirteenth aspect, alone or in combination with any one or more of the eleventh through twelfth aspects, the first wireless node is configured to report the round-trip time estimation to the second wireless node to enable the second wireless node to configure another timing configuration of the second wireless node. In a fourteenth aspect, alone or in combination with any one or more of the eleventh through thirteenth aspects, a report of the round-trip time estimation is a media access control control element message. In a fifteenth aspect, alone or in combination with the fourteenth aspect, a report of the round-trip time estimation is provided in connection with a request from the second wireless node.

In a sixteenth aspect, alone or in combination with any one or more of the fourteenth through fifteenth aspects, a report of the round-trip time estimation is an aperiodic report. In a seventeenth aspect, alone or in combination with any one or more of the fourteenth through sixteenth aspects, a report of the round-trip time estimation is a periodic report. In an eighteenth aspect, alone or in combination with any one or more of the fourteenth through seventeenth aspects, a report of the round-trip time estimation is provided in connection with an explicit indication or an implicit indication.

In a nineteenth aspect, alone or in combination with any one or more of the first through eighteenth aspects, the first wireless node synchronizes the timing configuration based at least in part on a timing advance group, which includes the second wireless node, identified based at least in part on information included in the round-trip time timing advance indicator. In a twentieth aspect, alone or in combination with the nineteenth aspect, the timing advance group is a subgroup of another timing advance group defined based at least in part on at least one of a downlink reference timing or an uplink reference timing. In a twenty-first aspect, alone or in combination with any one or more of the nineteenth through twentieth aspects, the first wireless node updates stored information relating to the timing advance group based at least in part on receiving the round-trip time timing advance indicator.

In a twenty-second aspect, alone or in combination with any one or more of the nineteenth through twenty-first aspects, the timing advance group is configured based at least in part on radio resource control signaling. In a twenty-third aspect, alone or in combination with any one or more of the nineteenth through twenty-second aspects, each wireless node of the timing advance group is associated with a common cell group. In a twenty-fourth aspect, alone or in combination with any one or more of the nineteenth through twenty-third aspects, the timing advance group includes a plurality of wireless nodes sharing a common round-trip time timing estimate. In a twenty-fifth aspect, alone or in combination with any one or more of the first through twenty-fourth aspects, the round-trip time timing advance indicator is based at least in part on at least one of an offset between downlink transmission and uplink reception of the second wireless node, a transmission to reception switching time of the second wireless node, or a hardware characteristic of the second wireless node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first wireless node, comprising:
    receiving, by the first wireless node, a timing advance indicator;
    receiving, by the first wireless node and from a second wireless node, a round-trip time timing advance indicator, that is a timing offset;
    adjusting, by the first wireless node, an uplink transmission timing based on the timing advance indicator offset by the round-trip time timing advance indicator; and
    aligning, by the first wireless node, uplink reception timing based on the uplink transmission timing.

2. The method of claim 1, wherein the round-trip time timing advance indicator is independent from the timing advance indicator.

3. The method of claim 1, wherein, relative to the timing advance indicator, the round-trip time timing advance indicator is associated with at least one of:
    a different quantity of bits, a reduced separation time between round-trip time timing advance indicators,
a reduced threshold transmission timing error, or
a reduced threshold timing advance error.

4. The method of claim 1, wherein the round-trip time timing advance indicator is received in connection with an uplink reference signal or a downlink reference signal transmitted by the first wireless node.

5. The method of claim 1, further comprising:
determining a round-trip time estimation based at least in part on the round-trip time timing advance indicator.

6. The method of claim 1, wherein the round-trip time timing advance indicator is received in connection with a request for the round-trip time timing advance indicator and using at least one of:
a random access channel message,
a contention free random access channel message,
a physical uplink control channel, or
a media access control control element of a physical uplink shared channel.

7. The method of claim 1, further comprising:
determining a round-trip time estimation based at least in part on a downlink reference signal.

8. The method of claim 7, wherein a timing to receive the downlink reference signal is different from a timing reference used to receive other downlink signals from the second wireless node.

9. The method of claim 7, wherein the downlink reference signal is a wideband downlink reference signal or is associated with a threshold periodicity.

10. The method of claim 7, further comprising:
reporting the round-trip time estimation to the second wireless node to enable the second wireless node to configure another timing configuration of the second wireless node.

11. The method of claim 10, wherein the round-trip time estimation is reported through a media access control (MAC) control element (CE) message.

12. The method of claim 10, wherein the round-trip time estimation is reported in connection with a request from the second wireless node.

13. A first wireless node for wireless communication, comprising:
a memory; and
one or more processors, coupled to the memory, configured to:
receive a timing advance indicator;
receive, from a second wireless node, a round-trip time timing advance indicator that is a timing offset;
adjust an uplink transmission timing based on the timing advance indicator offset by the round-trip time timing advance indicator; and
align uplink reception timing based on the uplink transmission timing.

14. The first wireless node of claim 13, wherein the round-trip time timing advance indicator is independent from the timing advance indicator.

15. The first wireless node of claim 13, wherein, relative to the timing advance indicator, the round-trip time timing advance indicator is associated with at least one of:
a different quantity of bits,
a reduced separation time between round-trip time timing advance indicators,
a reduced threshold transmission timing error, or
a reduced threshold timing advance error.

16. The first wireless node of claim 13, wherein the round-trip time timing advance indicator is received in connection with an uplink reference signal or a downlink reference signal transmitted by the first wireless node.

17. The first wireless node of claim 13, wherein the one or more processors are further configured to:
determine a round-trip time estimation based at least in part on the round-trip time timing advance indicator.

18. The first wireless node of claim 13, wherein the round-trip time timing advance indicator is received in connection with a request for the round-trip time timing advance indicator and using at least one of:
a random access channel message,
a contention free random access channel message,
a physical uplink control channel, or
a media access control control element of a physical uplink shared channel.

19. The first wireless node of claim 13, wherein the one or more processors are further configured to:
determine a round-trip time estimation based at least in part on a downlink reference signal.

20. The first wireless node of claim 19, wherein the one or more processors are further configured to:
report the round-trip time estimation to the second wireless node to enable the second wireless node to configure another timing configuration of the second wireless node.

* * * * *